(12) United States Patent
Kobayashi et al.

(10) Patent No.: US 7,114,772 B2
(45) Date of Patent: Oct. 3, 2006

(54) CONSOLE FOR VEHICLE

(75) Inventors: Hideki Kobayashi, Takanezawa-machi (JP); Yoku Tahira, Niiza (JP)

(73) Assignees: Honda Access Corporation, Saitama-ken (JP); TS Tech Co., Ltd., Saitama-ken (JP)

( * ) Notice: Subject to any disclaimer, the term of this patent is extended or adjusted under 35 U.S.C. 154(b) by 0 days.

(21) Appl. No.: 10/897,075

(22) Filed: Jul. 23, 2004

(65) Prior Publication Data

US 2005/0225130 A1 Oct. 13, 2005

(30) Foreign Application Priority Data

Mar. 31, 2004 (JP) ............... 2004-101742

(51) Int. Cl.
*A47C 7/62* (2006.01)

(52) U.S. Cl. .................. 297/188.04; 297/188.07; 297/188.14; 297/188.19

(58) Field of Classification Search ........... 297/188.07, 297/188.06, 188.04, 188.19, 188.15, 188.14
See application file for complete search history.

(56) References Cited

U.S. PATENT DOCUMENTS

| | | | | | |
|---|---|---|---|---|---|
| 2,132,279 | A | * | 10/1938 | Wicknick et al. ... | 297/188.07 X |
| 3,237,824 | A | * | 3/1966 | Gunckel ............ | 297/188.19 X |
| 5,222,780 | A | * | 6/1993 | Reh et al. ......... | 297/188.19 |
| 5,286,084 | A | * | 2/1994 | Bart ................. | 297/188.04 X |
| 5,415,457 | A | * | 5/1995 | Kifer ................ | 297/188.04 |
| 5,524,959 | A | * | 6/1996 | Scott ................ | 297/188.04 X |
| 5,788,324 | A | * | 8/1998 | Shea et al. .......... | 297/188.04 X |
| 5,911,471 | A | * | 6/1999 | Benedict et al. .... | 297/188.04 X |
| 6,059,358 | A | * | 5/2000 | Demick et al. ...... | 297/188.04 |
| 6,131,993 | A | * | 10/2000 | Pesta et al. ......... | 297/188.04 |
| 6,199,948 | B1 | * | 3/2001 | Bush et al. ......... | 297/188.04 X |
| 6,220,660 | B1 | * | 4/2001 | Bedro et al. ........ | 297/188.04 |
| 6,386,629 | B1 | * | 5/2002 | Severinski et al. . | 297/188.14 X |
| 6,419,314 | B1 | * | 7/2002 | Scheerhorn ........ | 297/188.19 |
| 6,508,508 | B1 | * | 1/2003 | Bargiel ............. | 297/188.19 X |
| 6,547,323 | B1 | * | 4/2003 | Aitken et al. ....... | 297/188.04 X |
| 6,702,375 | B1 | * | 3/2004 | Laskowski et al. .. | 297/188.07 |
| 6,843,528 | B1 | * | 1/2005 | Glynn et al. ....... | 297/188.19 X |
| 6,860,550 | B1 | * | 3/2005 | Wojcik ............. | 297/188.04 X |
| 2002/0089217 | A1 | * | 7/2002 | Scheerhorn ........ | 297/188.19 |
| 2003/0038514 | A1 | * | 2/2003 | Johnston ........... | 297/188.04 |

FOREIGN PATENT DOCUMENTS

JP 3252191 11/2001

* cited by examiner

*Primary Examiner*—Rodney B. White
(74) *Attorney, Agent, or Firm*—Westerman, Hattori, Daniels & Adrian, LLP.

(57) ABSTRACT

A console for vehicle capable of stably carrying goods during the travel of the vehicle, with improved convenience in accordance with sorts of goods to be carried. A console for vehicle 30 is detachably attached to a folding seat 10 in a manner covering a rear surface of a seat back 14 with a front surface of the seat back 14 being folded to face a seat portion 12. The console for vehicle 30 includes a first recess 36 for storage of goods with an opening on a top side; and a lid body 36 for opening and closing the first recess 36. The lid body 36 includes an upper lid portion and a lower lid portion, with the former being slidable relative to the latter.

6 Claims, 13 Drawing Sheets

CONSOLE FOR VEHICLE

BACKGROUND OF THE INVENTION

1. Field of the Invention

The present invention relates to a console for vehicle which is installed inside a vehicle for the purpose of storing or placing goods therein.

2. Description of the Related Art

Japanese Patent Registered Publication No. 3252191 discloses a conventional table assembly for use with a seat back, comprising a tray detachably attached to a rear surface of the seat back of which the lower portion being connected via a hinge fitting to a back end of a seat portion so that the seat back is capable of being folded forward, wherein the tray whose surface is to be arranged approximately horizontal in use, is formed integrally with a circumferential frame provided therearound so as to form a substantially container-shaped tray unit, such that the container-shaped tray unit covers the rear surface and circumference of the seat back from the rear side thereof, while a side wall of the circumferential frame is formed to have an approximately triangular shape with an increasing width toward a back, said container-shaped tray unit including a bracket on a rear part thereof so that the bracket projects downward and is hooked on a lug protruding sidewise from the hinge fitting.

According to the conventional table assembly for use with a seat back, as the tray formed integrally with the circumferential frame makes up the substantially container-shaped tray unit, the whole circumference of the seat back can be fitted into the circumferential frame when the seat back is covered with the tray unit from the rear side thereof. At this moment, since the side wall of the circumferential frame has an approximately triangular shape, the side surface of the tray unit can be overlapped with that of the seat back with the top surface of the tray being kept horizontal. Accordingly, even if it is used for a seat back of a type that remains inclined when folded forward, the top surface of the tray is kept horizontal, and thus it can be used in a comfortable manner. Further, the table assembly can be attached to the seat back in a detachable manner, by overlapping the tray unit with the rear surface of the seat back while hooking the bracket projecting downward at the lower portion of the tray on the lug protruding sidewise from the hinge fitting, thus simplifying the operations for attachment and detachment of the assembly.

According to the conventional table assembly (i.e., the conventional console for vehicle) of a type that is attached to a seat back, however, the tray unit is detachably attached to the rear surface of the seat back, with the lower portion of the seat back being forward-foldably connected via the hinge fitting to the back end of the seat, and thus goods stored in or placed on the table assembly are subjected to the vibration of the seat back occurring during the travel of the vehicle. As a result, there has been a problem that goods are liable to get unstable during the travel.

SUMMARY OF THE INVENTION

The present invention has been made to solve the above problem. It is accordingly an object of the present invention to provide a console for vehicle which enables goods to be carried stably during the travel of the vehicle.

It is another object of the present invention to provide a console for vehicle which can improve a convenience in accordance with different types of goods stored in or placed on the console.

In order to attain the above object, according to a first aspect of the present invention, there is provided a console for vehicle, the console being detachably attached to a seat portion of a folding seat in a manner covering a rear surface of a seat back of the folding seat with a front surface of the seat back being folded to face the seat portion.

Thus, as the console for vehicle is detachably attached to the seat portion in a manner covering a rear surface of a seat back with a front surface of the seat back being folded to face the seat portion, it is possible to carry goods stably, while suppressing the vibration of the seat back during the travel of the vehicle.

According to a second aspect of the present invention, there is provided a console for vehicle as set forth in the first aspect, including: a recess for storage of goods with an opening on a top side; and a lid body for opening and closing the recess, the lid body including an upper lid portion and a lower lid portion, with the upper lid portion being slidable relative to the lower lid portion.

According to the console for vehicle of the second aspect, the top surface of the lid body of the console can have an increased area, thus enabling the improvement of a convenience in placing goods on the top surface, besides the above-mentioned advantage.

BRIEF DESCRIPTION OF THE DRAWINGS

These and other objects and advantages of the present invention will become more apparent upon reading of the following detailed description and the accompanying drawings in which:

FIG. 7A is a perspective view showing a handle assembly which is to be incorporated into the console for vehicle illustrated in FIG. 2, while

DETAILED DESCRIPTION OF THE PREFERRED EMBODIMENTS

A preferred embodiment of the present invention will now be described in detail with reference to the accompanying drawings.

FIGS. 1 to 14 show a console for vehicle according to an embodiment of the invention.

Figure 1:
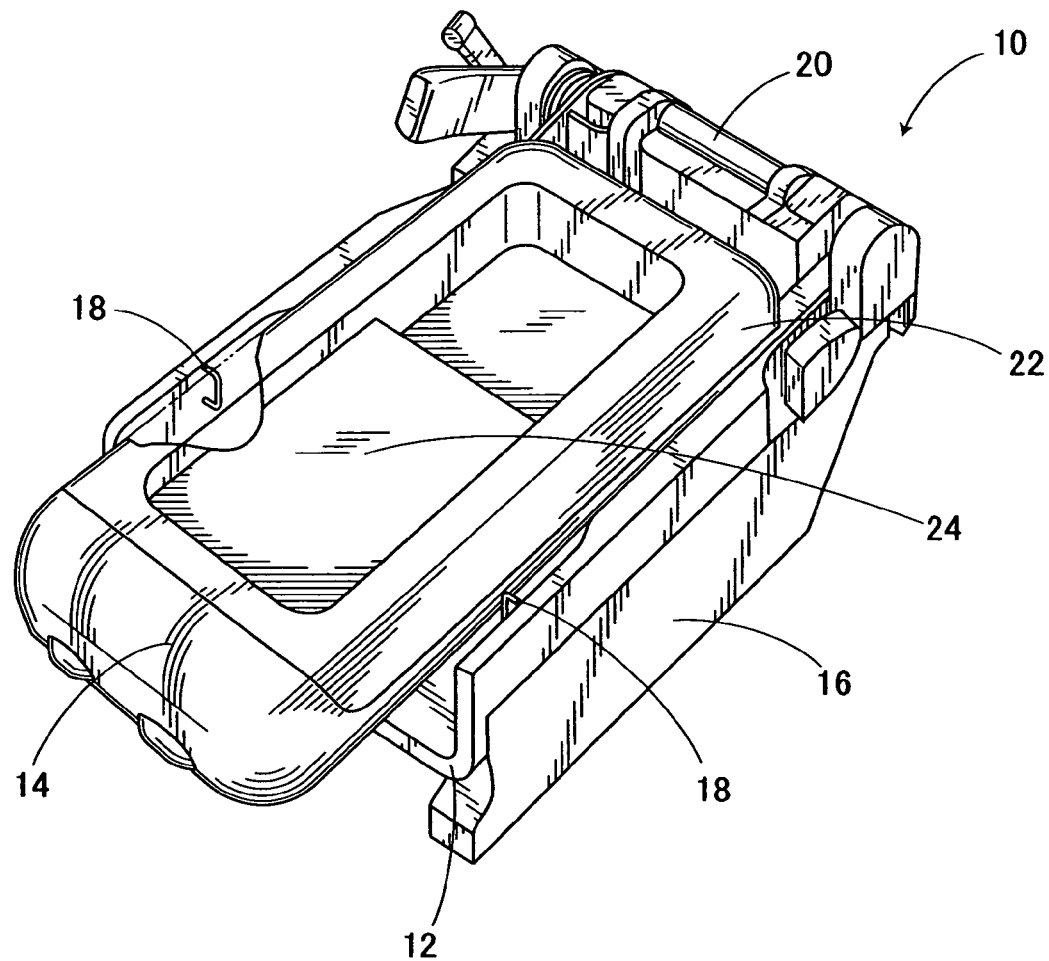
FIG. 1 is a perspective view showing a folding seat to which a console for vehicle of the present invention is attached.
Figure 2:
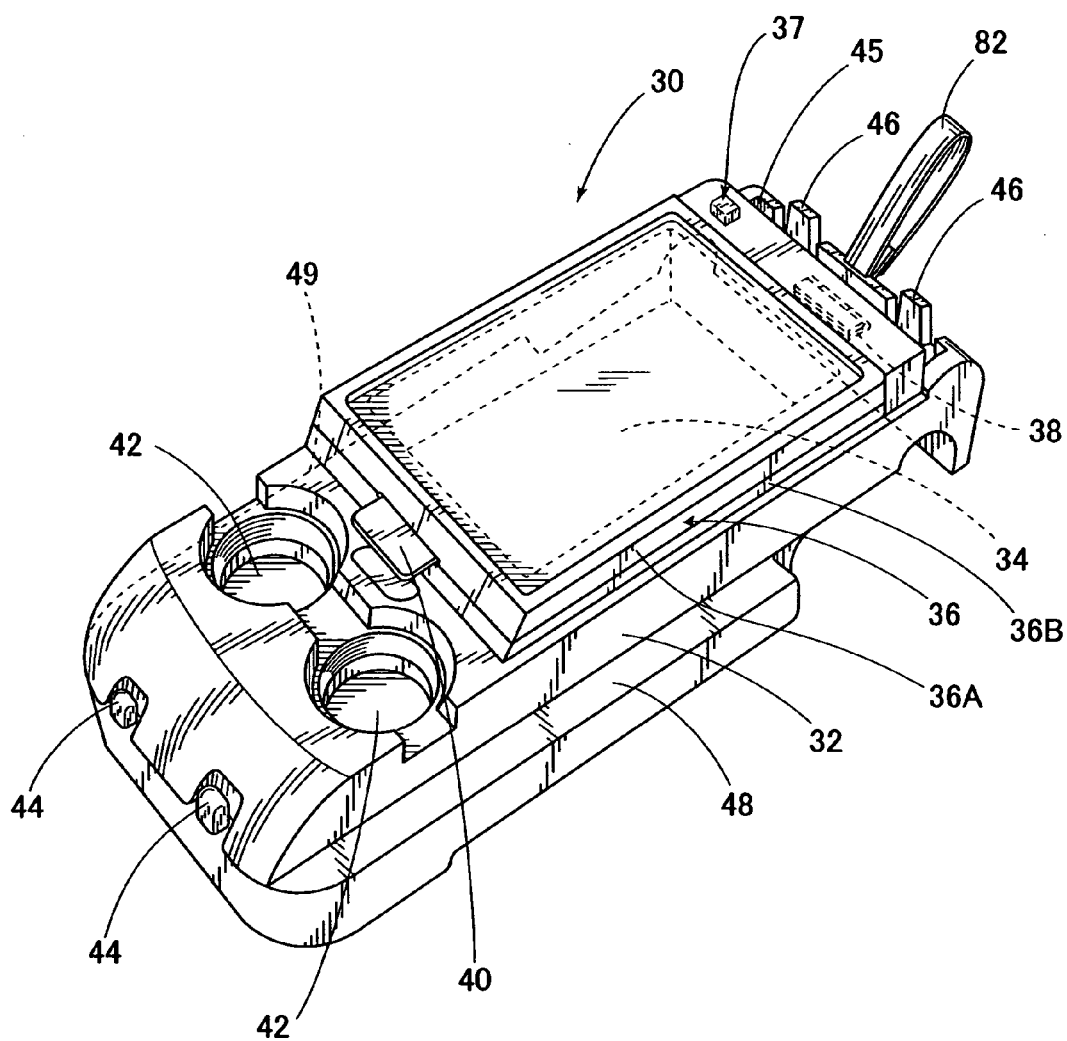
FIG. 2 is a perspective view showing the console for vehicle according to an embodiment of the present invention, illustrating a front surface thereof.

FIG. 1 is a perspective view showing a folding seat 10 to which is attached a console for vehicle of an embodiment of the present invention. The folding seat 10 includes a seat portion 12 and a seat back 14. The seat portion 12 includes a base frame 16 with a bottom for a passenger to sit thereon via a seat cushion. Right and left lower ends of the base frame 16 are formed with a leg, respectively so as to provide a pair of legs extending longitudinally to thereby support the folding seat 10 substantially horizontally, with the level of the folding seat 10 being raised relative to a vehicle floor on which the folding seat 10 is mounted. On the other hand, right and left upper ends of the base frame 16 are formed with a sleeve, respectively, also extending longitudinally. The inside of each sleeve is formed on its front side with a slope inclined toward a front, while a distal end of the slope is formed with an engagement U-shaped fitting 18 for engaging with a hereinafter described engagement protrusion formed on the console for vehicle. Each U-shaped fitting 18 comprises a U-shaped member with its open ends being fixed to the inside surface of the sleeve. The base frame 16 is provided on its back end with a shaft around which the seat back 14 is rotated as well as a grip 20 for carrying the folding seat 10. On the rear surface of the seat back 14 is provided a seat back frame 22 for reinforcing the seat back 14, said seat back frame 22 having an engagement portion on its right and left ends for rotatably engaging with a shaft of the base frame 16. In the middle of the rear surface of the seat back frame 22 is formed a recess 24. The folding seat 10 can change its posture from a first state in which the seat back 14 serves as a back rest with a passenger sitting on the seat portion 12 to a second state in which the folding seat 10 is folded with the front surface of the seat back 14 facing the seat portion 12.

Figure 7A:
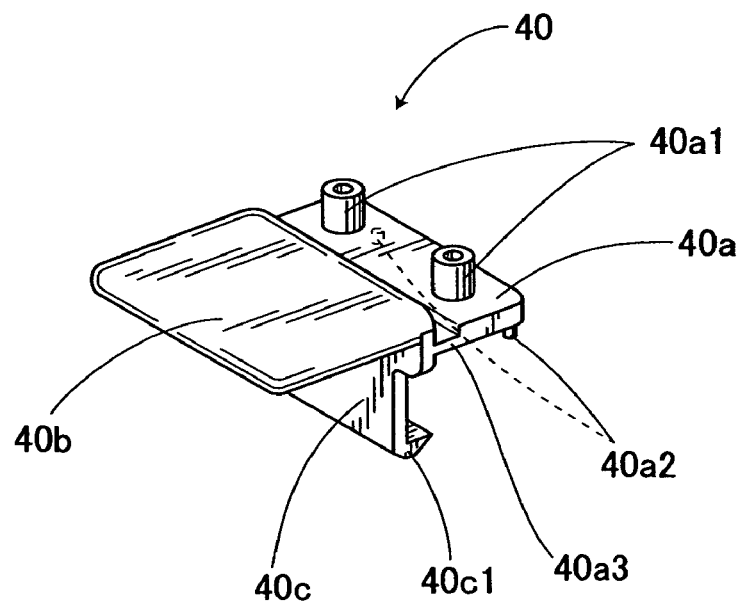
Figure 7B:
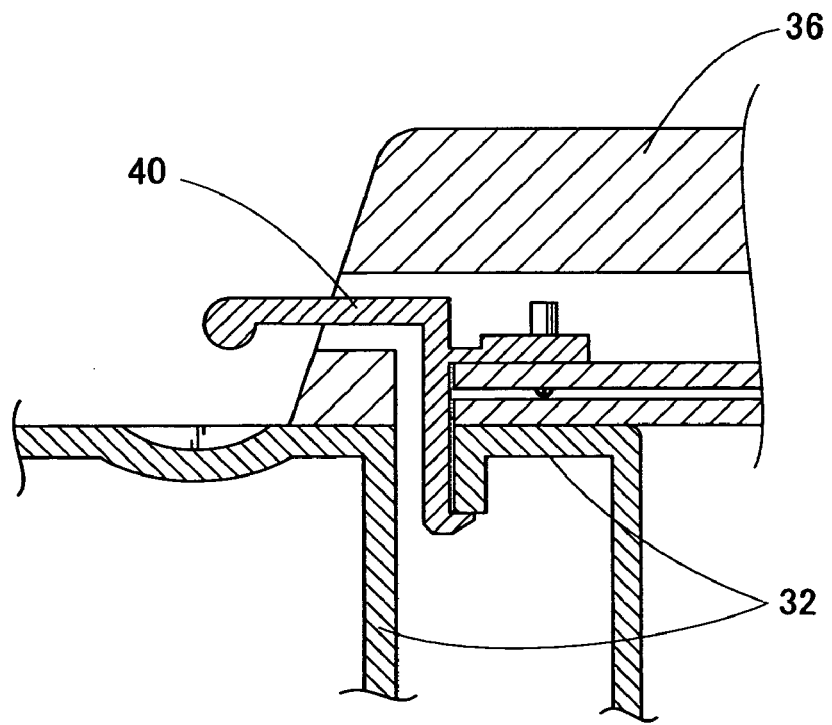
FIG. 7B is a longitudinal section of the same as incorporated thereinto.
Figure 8:
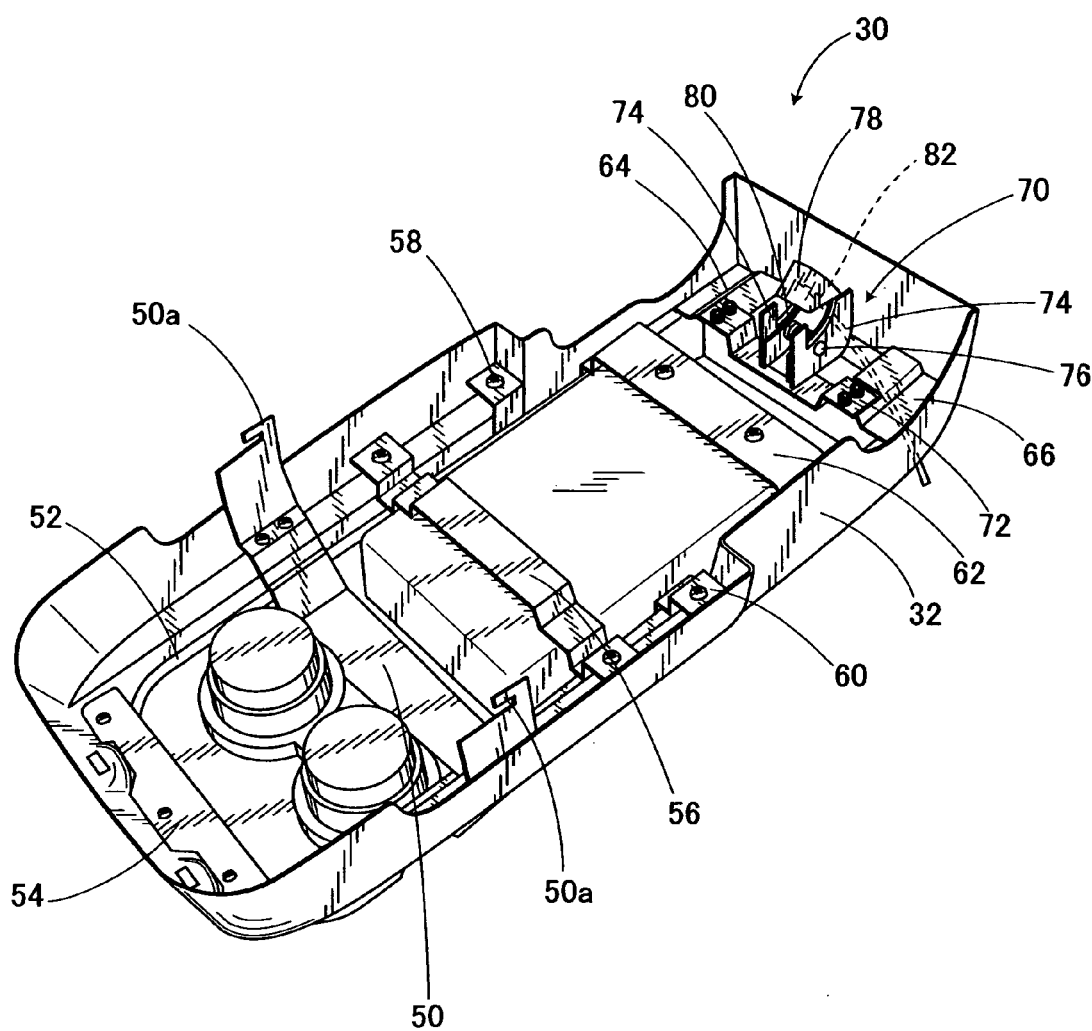
FIG. 8 is a perspective view showing the console for vehicle according to the embodiment of the present invention, illustrating a rear surface thereof.

FIGS. 2 through 8 show a console for vehicle according to the present embodiment. FIG. 8 is a rear perspective view thereof. The console for vehicle 30 has a substantially rectangular box shape which is open on a bottom side. The console for vehicle 30 includes a console body 32. The console body 32 has a top potion formed with a recess of substantially a rectangular shape, which is open on a top side for housing goods therein. Above the recess 34 is provided a lid body 36 of nearly a rectangular parallelepiped shape, in order to open or close an opening of the recess 34. The recess 34 may have its bottom surface covered with a suitable floor mat such as a needle-punched carpet or the like.

Figure 3:
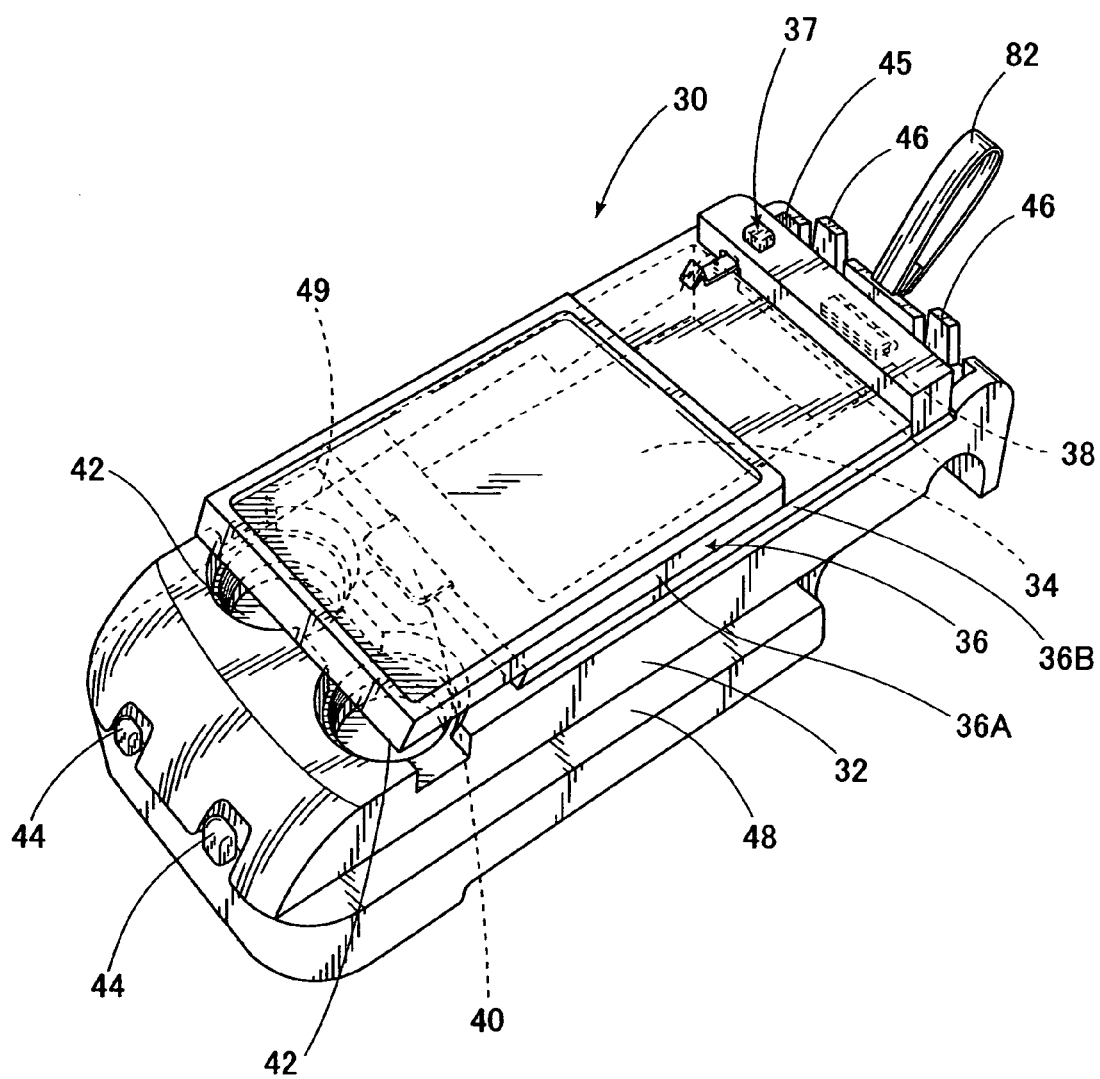
FIG. 3 is a perspective view showing the console for vehicle of the embodiment, illustrating an upper lid portion of a lid body thereof being slid sideway.

The lid body 36 comprises an upper lid portion 36A and a lower lid portion 36B with the upper lid portion 36A being slidable relative to the lower lid portion 36B, as shown in FIG. 3.

Figure 4:
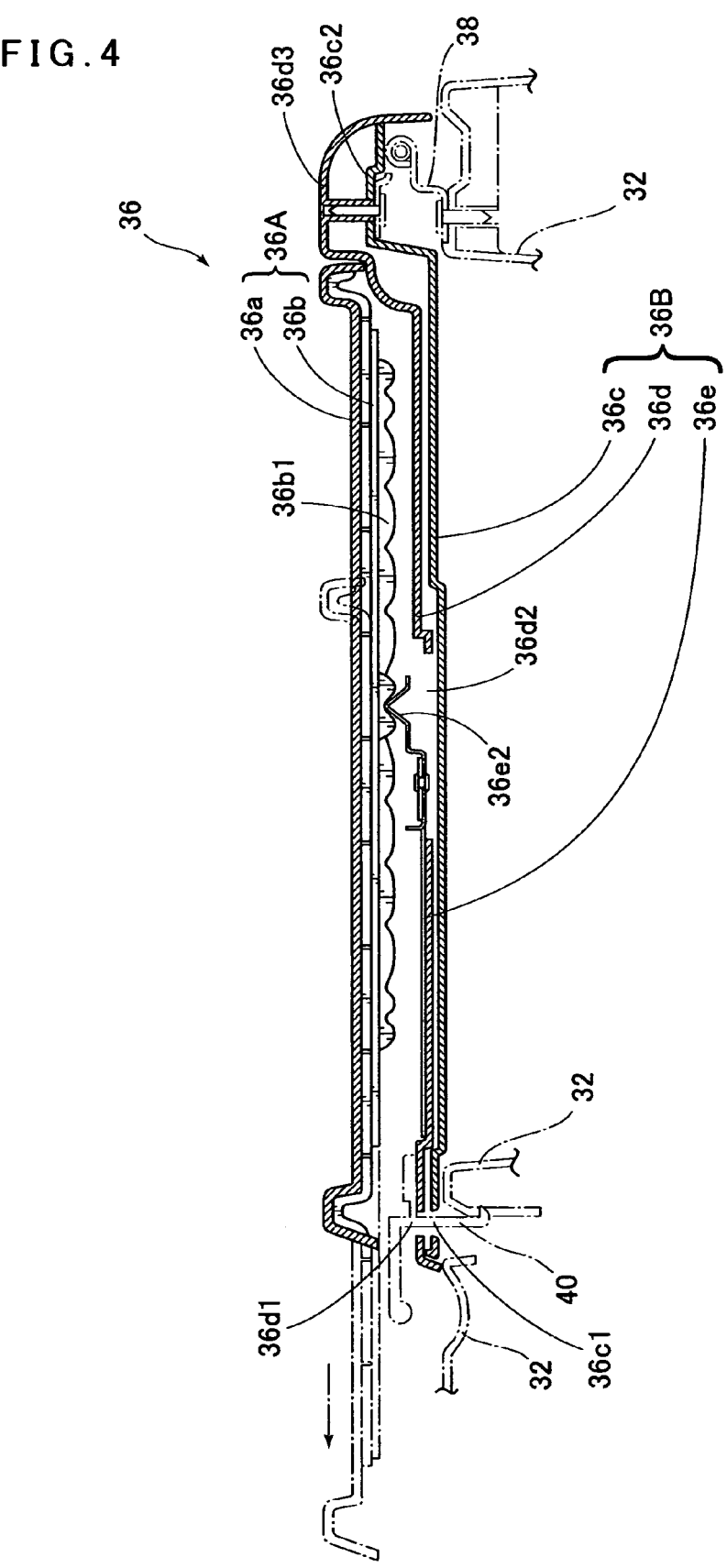
FIG. 4 is a longitudinal section of the lid body illustrated in FIG. 2.
Figure 5:
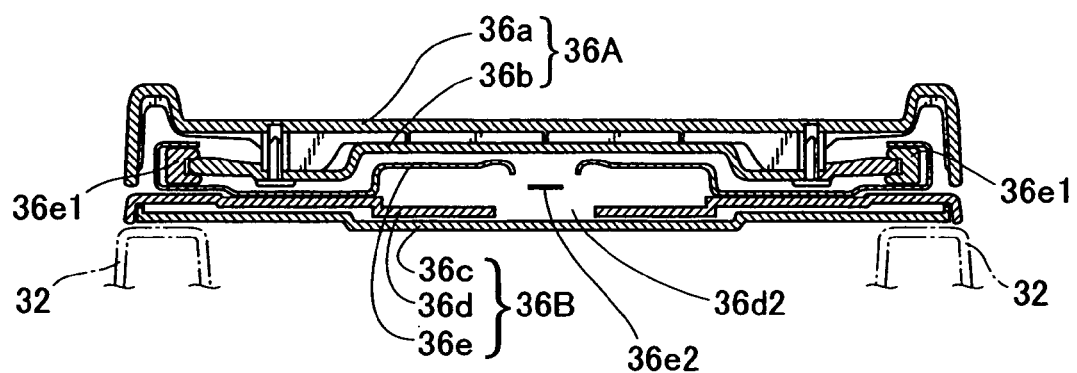
FIG. 5 is a transverse section of the lid body illustrated in FIG. 2.

FIG. 4 is a longitudinal section of the lid body 36, while FIG. 5 is a transverse section thereof.

The upper lid portion 36A is made up of: a tray member 36a of nearly a rectangular box shape which is open on a bottom side; and a slide member 36b of a nearly rectangular plate shape, fixed to below the tray member 36a. The tray member 36a has an upward-protruded edge on a top surface thereof. The slide member 36b is formed such that it has a smaller width than a width between opposite inside surfaces of the tray member 36a, having right and left edges which are disposed distant from the inner surface of the tray member 36a, and inclined first to define an increasing thickness toward the outside and then inclined to define an decreasing thickness toward the outside. A rib 36b1 is formed in the center of the slide member 36b in the lateral direction, including recesses at predetermined intervals between a middle portion and a back end in the longitudinal direction.

The lower lid portion 36B is made up of: a first base member 36c of nearly a rectangular plate shape which is disposed in the lowermost; a second base member 36d of nearly a rectangular plate shape, fixed to a top surface of the first base member 36c; and a slide rail member 36e of nearly a rectangular plate shape, fixed to a front part of a top surface of the second base member 36d.

The first base member 36c includes a first rectangular opening 36c1 of nearly a rectangular shape of which the lateral side is longer, said first rectangular opening 36c1 being provided in the center of a front end of the first base member 36c, while the first base member 36c also includes a rise 36c2 of which the lateral length is longer, said rise 36c2 being open on a rear side, provided in the center of a back end of the first base member 36c.

The second base member 36d includes: a second rectangular opening 36d1 of nearly a rectangular shape of which the lateral side is longer, said second rectangular opening 36d1 being provided in the center of a front end of the second base member 36d; a third rectangular opening 36d2 of which the longitudinal side is longer, provided in the center of the second base member 36d; and a rise 36d3 which is open on a bottom side, provided between the right and left side surfaces on a rear side of the second base member 36d. The second base member 36d is formed such that its opposite edges protrude downwardly, defining a larger width than the width between the side surfaces of the first base member 36c.

The rise 36c2 of the first base member 36c and the rise 36d3 of the second base member 36d are formed rearwardly of the back end of the tray member 36a. Further, the rise 36d3 of the second base member 36d is formed to have a top surface substantially flush with a top surface of the projected edge of the tray member 36a. On the other hand, the slide rail member 36e is formed such that it has a lateral width larger than that of the slide member 36b but smaller than the width between the right and left inside surfaces of the tray member 36a, while the slide rail member 36e has a longitudinal width substantially half the longitudinal width of the second base member 36d. The right and left ends of the slide rail member 36e are each formed with a flexion which is bent upward so as to be letter "U"-shaped in a font view. In the interior space of each flexion of the slide rail member 36e is fixedly provided a rail member 36e1. Above the third rectangular opening 36d2 of the second base member 36d is fixedly provided a spring member 36e2, located in the center of the back end portion of the slide rail member 36e, said spring member 36e2 being formed by convexly bending a resilient plate member of a nearly rectangular shape of which the longitudinal side is longer.

The right and left ends of the slide member 36b are slidably fitted into the grooves of the respective rail members 36e1 of the slide rail member 36e. The spring member 36e2 of the slide rail member 36e is abutted to the end of a rib-shaped portion 36b1 of the slide member 36b in a manner allowing the slide member 36 to slide intermittently.

A hinge 38 is provided on a back end of the lid body 36 with one end thereof being fixed to the console body 32 while the other end thereof being fixed to the first base member 36c and second base member 36d of the lid body 36 so that the lid body 36 is capable of being rotated vertically.

Figure 6:
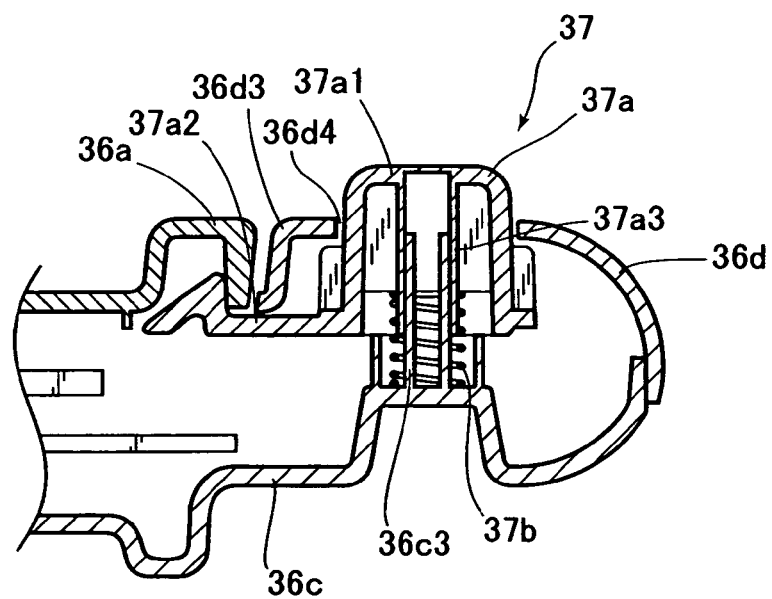
FIG. 6 is a longitudinal section of a neighborhood of a locker means illustrated in FIG. 2.

Also, a locker means 37 is provided adjacent to a side edge of a back end of the lid body 36, in order to releasably lock the upper lid portion 36A relative to the lower lid portion 36B. FIG. 6 is a longitudinal section of a neighborhood of the locker means 37. The locker means 37 comprises: a locking member 37a for locking the upper lid portion 36A relative to the lower lid portion 36B; and a coil spring 37b for urging the locking member 37a to the inside surface of the second base member 36d. The locking member 37a includes: a button 37a1 of nearly a rectangular box shape of which the bottom side is open; and an engaging portion 37a2 extending forward from a lower end of the button 37a1 so as to be engageable with the inside surface of the edge of the tray member 36a. Inside the button 37a is formed a guide tube 37a3 which is formed into a nearly cylindrical shape, extending downwardly from a top surface so as to guide the inside of the coil spring 37b. The engaging portion 37a2 has a distal end formed such that it extends substantially vertically and then inclines downwards toward the front.

The second base member 36d is formed with a rectangular hole 36d4 of nearly a rectangular shape, in order for the locking member 37a to be able to protrude from the top surface of the second base member 36d. The first base member 36c is formed with a guide tube 36c3 which is formed into a nearly cylindrical shape, extending upwardly from a top surface so as to engage with the aforesaid guide tube 37a3. The coil spring 37b has its upper end biasedly abutted to the locking member 37a while it has its lower end biasedly abutted to the top surface of the first base member 36c. In the meantime, the locking member 37a and the guide tube 36c3 of the first base member 36c are structured such that the engagement of the distal end of the engaging portion 37a2 of the locking member 37a with the inside surface of the edge of the tray member 36a due to the locking member 37a being biased by the coil spring 37b, is able to be released by the descent of the locking member 37a against the biasing force from the coil spring 37a.

A handle assembly 40 is fixed to the front end of the lid body 36 in a manner protruding from the front surface of the lid body 36, said handle assembly 40 being used for rotation of the lid body 36 in the vertical direction. The handle assembly 40 is, as shown in FIG. 7A, is substantially of a letter-T shape in a side view. The handle assembly 40 comprises: a substantially tabular fixing portion 40a for fixing the handle to the lid body 36; a substantially tabular handle part 40b to grasp when the lid body 36 is to be rotated in the vertical direction, said handle part 40b protruding from the front surface of the lid body 36, in parallel with the said fixing portion 40; and a substantially tabular locking portion 40c extending nearly perpendicularly to the fixing portion 40a and the handle part 40b in a manner capable of being inserted into a rectangular hole of nearly a rectangular shape of which the lateral side is longer, said rectangular hole being formed in front of the recess 34 of the console body 32.

On a top surface of the fixing portion 40a are formed cylindrical portions 40a1 for inserting male screws thereinto when fixing the handle assembly 40 to the lid body 36. On the other hand, on a lower surface of the fixing portion 40a are formed dowels 40a2, for positioning the handle assembly 40 relative to the lid body 36. The lid body 36 is formed with round holes, corresponding in position to these dowels 40a2 so that the dowels 40a2 are fitted thereinto, and the lower surface of the fixing portion 40a comes into contact with a certain surface of the lid body 36 for fixing the fixing portion 40a. The fixing portion 40a is joined to a rear surface of the locking portion 40c, while a junction 40a3 thus formed is formed comparatively thin as compared with the other portions of the fixing portion 40a. The edges of the handle part 40b are rounded, while the handle part 40b and the locking portion 40c are joined to each other so that they look like a letter "L" in a side view. The locking portion 40c has a lower end 40c1 bent toward the rear so that the handle assembly 40 may be locked by the lower end of the rectangular hole formed in front of the recess 34 of the console body 32.

The handle assembly 40 is fixed by fixing the fixing portion 40a to the second base member 36d so that the locking portion 40c thereof may penetrate through the first rectangular hole 36c1 of the first base member 36c and the second rectangular hole 36d1 of the second base member 36d.

As shown in FIG. 7B, when the opening of the recess 34 formed in the console body 32 is closed by the lid body 36, the lower end 40c1 of the locking portion 40c of the handle assembly 40 is stopped by the lower end of the rectangular hole formed in front of the recess 34 of the console body 32, so that the lid body 36 is allowed to latch onto the console body 32. In the meantime, in front of the rectangular hole of the console body 32 is provided a recess formed by arc-shaping a part of the top surface of the console body 32.

On the other hand, when the opening of the recess 34 formed in the console body 32 is opened by the lid body 36, the handle part 40b of the handle assembly 40 is to be picked up to thereby release the engagement of the lower end 40c1 of the locking portion 40c of the handle assembly 40 with the lower end of the rectangular hole formed in front of the recess 34 of the console body 32. The handle part 40b and locking portion 40c of the handle assembly 40 are rotated substantially around the junction 40a3 of the fixing portion 40a of the handle assembly 40.

Recesses 42 of substantially circular section, which are open on a top side, are formed on a front part of the top portion of the console body 32, said recesses 42 serving as holes for placing articles such as cylindrical cans or cups therein. In the illustrated example, the number of the recesses 42 is two, provided on both right and left sides. Each recess 42 has a flat bottom and a stepped side surface defining an increasing diameter toward a top, In the illustrated example, the number of steps is three, and the uppermost step of one recess 42 has a part of its horizontal surface connected with that of the other recess 42, thus defining a flush surface between the two recesses 42, while a part of the horizontal surface of each step is communicated with the side surface of the console body 32.

In front of the recesses 42 of the console body 32 is provided an inclined surface which inclines toward the front, while projections 44, which are two, provided on right and left sides in the illustrated example, are provided on a distal end of the console body 32. said projections 44 projecting from the top surface of the console body 32 with a lower surface thereof surrounding the same so that certain articles such as handles of bags can be hung therefrom.

On a back end of the console body 32 are provided projections 46 which project from a lower surface of the back end adjacent to recesses 45, the number of said projections 46 being two in the illustrated example, so that certain articles such as handles of bags can be hung therefrom.

On right and left sides of the console body 32 are provided stepped portions 48, 49, respectively, each extending in a rear-to-front direction, and in a top-to-bottom direction of the console body 32.

Onto a rear surface of the console body 32 is fixed a fastening member 50 serving as a fastening means in the form of a nearly U-shaped long plate of which the lateral side is longer, said fastening member 50 being open toward a bottom, provided between the recess 34 of the console body 32 and the recesses 42 thereof, bridging the right and left sides of the console body 32. On right and left lower ends of the fastening member 50 is provided a fastening protrusion 50a, respectively, which engages with a fastening recess 18 formed on the sleeve portion of the folding seat 10. The fastening protrusions 50a extend downwardly from the right and left lower ends of the fastening member 50, each fastening protrusion 50a having a distal end bent toward a front, taking a nearly letter "L" shape in a side view.

On a rear surface of the console body 32 is fixed a reinforcing pipe 52, formed along the inside surface of the console body 32. The reinforcing pipe 52 is fixed to a beam member by welding or the like, and then the beam member is fixed to the console body 32, whereby the reinforcing pipe 52 is fixed to the console body 32.

The beam member is composed of: a first beam member 54 of nearly a long plate shape, of which the lateral side is longer, provided between the stepped portions 48 and 49 of the console body 32 on a front end thereof; a second beam member 56 of nearly a long plate shape, of which the lateral side is longer, provided between the right and left ends of the console body 32 in substantially the center thereof; a third beam member 58 of nearly a plate shape, provided on a back end of the stepped portion 48 of the console body 32; and a fourth beam member 60 of nearly a plate shape, provided on a back end of the stepped portion 49 of the console body 32; a fifth beam member 62 of nearly a long plate shape, of which the lateral side is longer, provided between the right and left ends of the console body 32 on a back end of the recess 34 thereof; a sixth beam member 64 of nearly a plate shape, provided on a right end of the console body 32 on a back end thereof; and a seventh beam member 66 of nearly a plate shape, provided on a left end of the console body 32 on a back end thereof.

On a rear surface of the console body 32 is fixedly provided an engaging portion 70 serving as an engaging means which detachably engages with a grip 20 of the folding seat 10 on a back end of the console body 32. The engaging portion is composed of: a coupling member 72 of nearly a long plate shape, of which the lateral side is longer, secured to the beam members 64 and 66 fixed to the console body 32 so as to couple the latter with the former; a pair of retaining members 74 provided on the coupling member 72, said retaining members 74 being joined perpendicularly to the coupling member 72 at a predetermined interval; a shaft 76 supported between the retaining members 74; a locking member 78 rotatably supported by the shaft 76 so as to be rotatable around the shaft 76; and a coil spring 80 supported by the shaft 76 so as to bias the locking member 78 clockwise. The lower ends of the retaining members 74 are formed so as to substantially conform to a contour of the grip 20 defining a maximum width in a circumferential direction thereof. The lower end 78a of the locking member 78 is formed so as to have an outer surface that is inclined downwards, from the front side of the console body 32 toward the rear side thereof so that it may be rotated anticlockwise against the biasing force from the coil spring 80 when contacted by an upper end 20a of the grip 20 of the folding seat 10. In the meantime, the grip 20 is formed substantially cylindrical, extending in the lateral direction, while the upper end 20a of the grip 20, which is to be contacted by the lower end 78a of the locking member 78, has a peripheral surface inclined downwards from the front toward the rear. Also, the locking member 78, which is biased clockwise by the coil spring 80, is so formed that the grip 20 of the folding seat 10 can be locked by the locking member 78 and the retaining members 74.

Further, one end of the locking member 78 is wound from the front surface side of the console body 32 around the shaft provided in the locking member 78 so that it is fixed thereto by sewing or the like, while the other end of the locking member 78 forms a loop on the front surface side of the console body 32, said loop being fixed by sewing or the like to provide a strap 82.

Next is a description of how the above-structured console 30 for vehicle is attached to or detached from the folding seat 10.

Figure 9A:
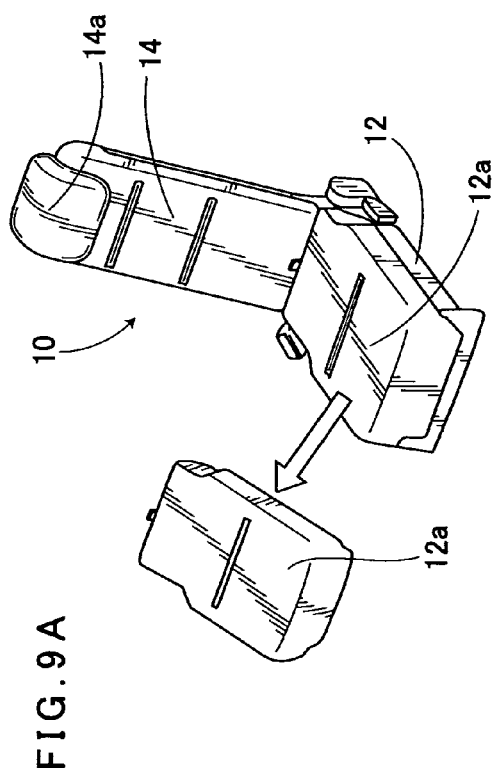
FIGS. 9A to 9C are explanatory perspective views illustrating a procedure for attaching the console for vehicle of the invention to a folding seat.
Figure 9C:
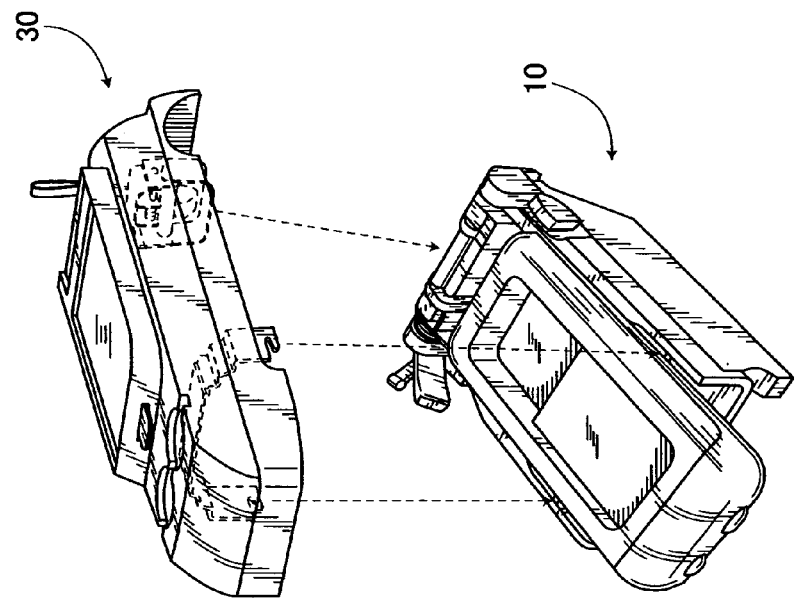
Figure 9B:
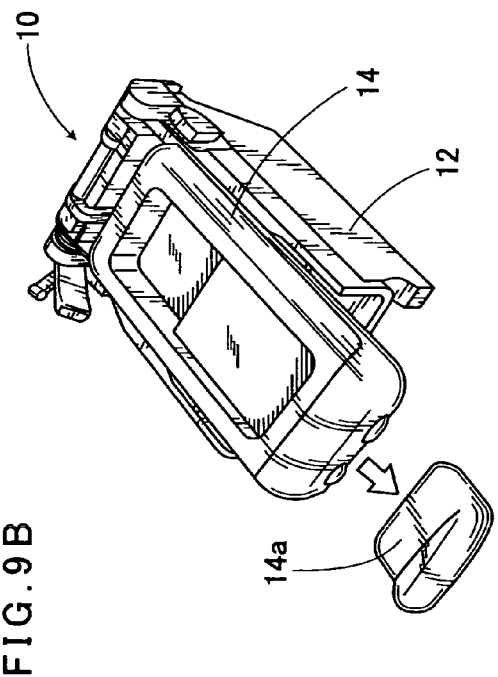
Figure 10:
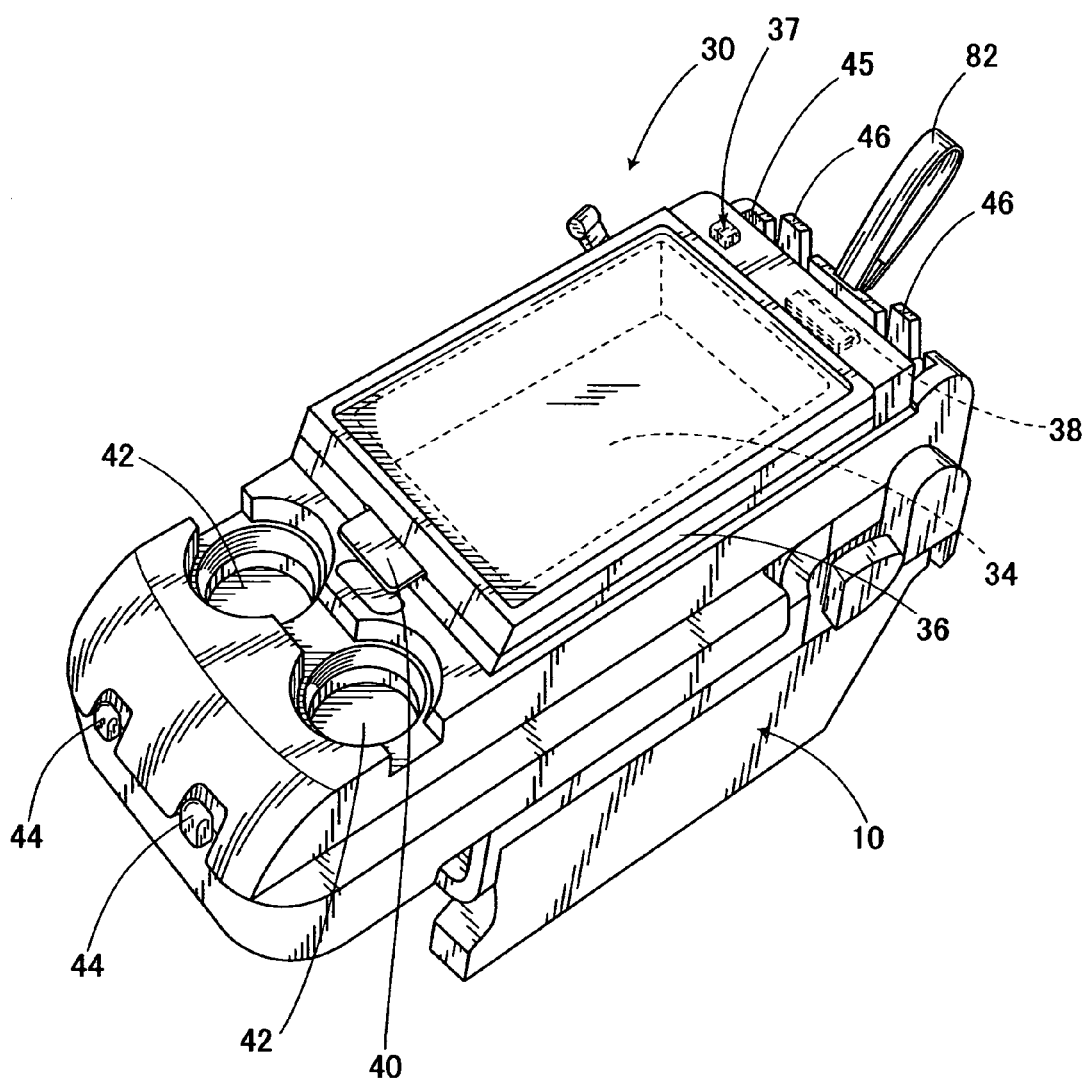
FIG. 10 is a perspective view showing the console for vehicle of the present invention attached to the folding seat.
Figure 11:
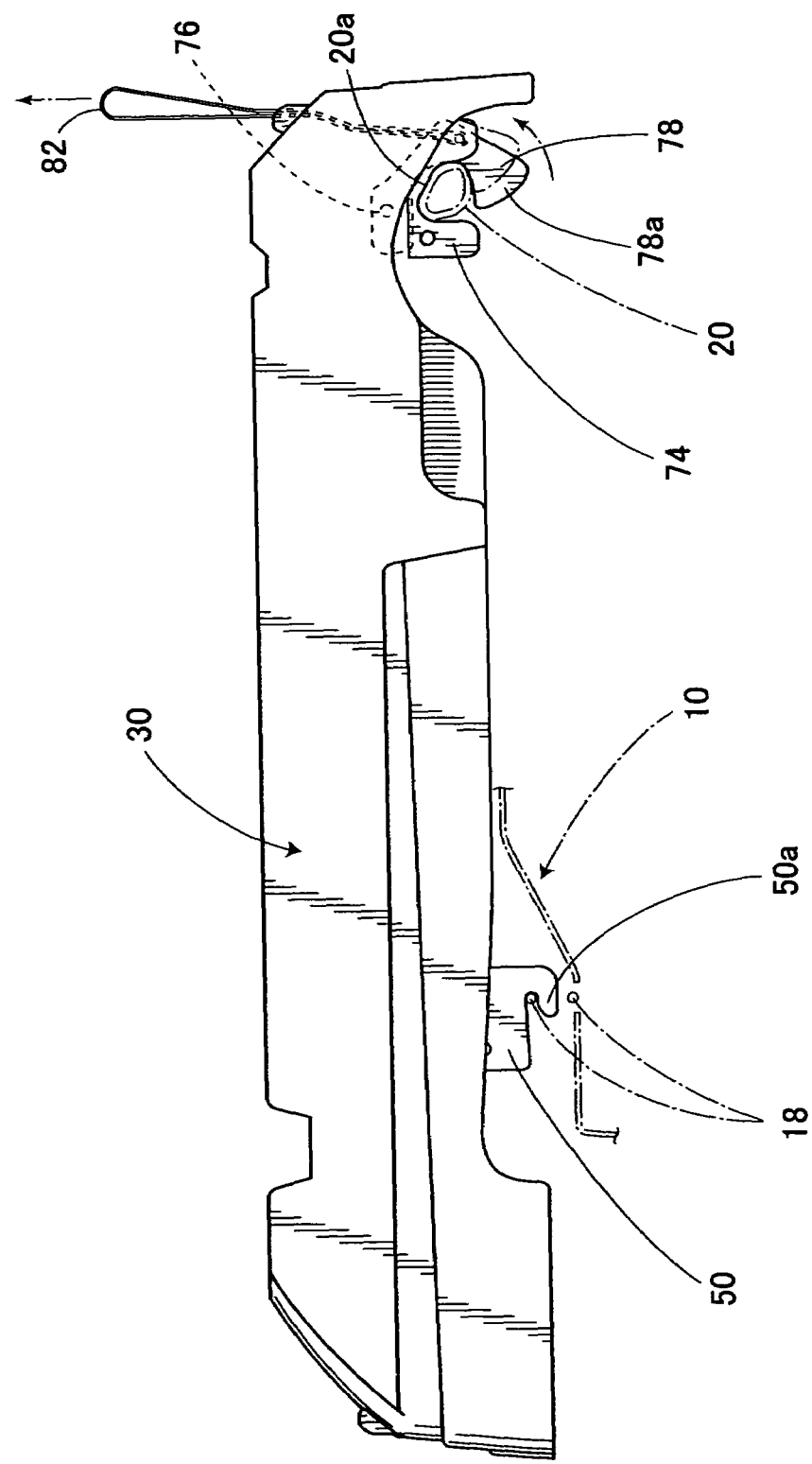
FIG. 11 is a side view showing the console for vehicle of the present invention attached to the folding seat.
Figure 12:
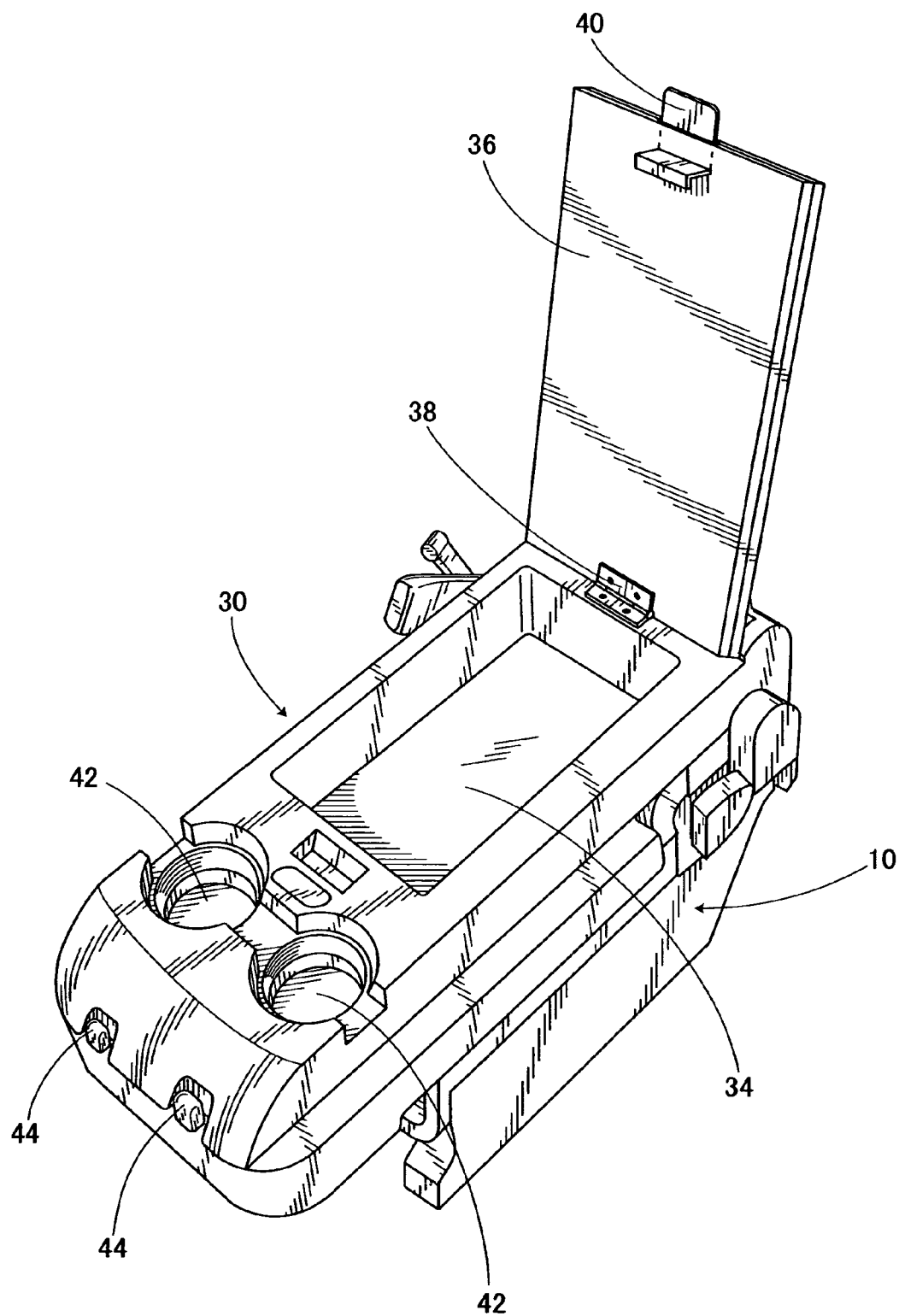
FIG. 12 is a perspective view showing the console for vehicle of the present invention attached to the folding seat, with the lid body being opened.

Initially, a seat cushion 12a is removed from a seat portion 12 of the folding seat 10, as shown in FIG. 9A. Then, the headrest 14a is removed from the seat back 14 of the folding seat 10 with the front of the seat back 14 being folded forward to oppose the seat portion 12 of the folding seat 10, as shown in FIG. 9B. Subsequently, the console 30 for vehicle is attached in a manner covering the rear surface of the folding seat 10, as shown in FIG. 9C. As illustrated in FIGS. 10 and 11, in the case that the console 30 for vehicle of the invention is attached to the folding seat 10, the folding seat 10 is first folded forward to allow the seat portion 12 and the front of the seat back 14 to be opposed to each other, and then the fastening protrusions 50a of the console 30 for vehicle is allowed to engage with the fastening recesses 18 of the folding seat 10, while the locking member 78 of the console 30 for vehicle is locked by the grip 20 of the folding seat 10. As shown in FIG. 12, articles can be placed in the recess 34 by opening the lid body 36 of the console 30 for vehicle with the console 30 for vehicle being attached to the folding seat 10.

In the case that the console 30 for vehicle is detached from the folding seat 10, the strap 82 of the console 30 for vehicle is pulled to thereby release the engagement of the locking member 78 with the folding seat 10 as well as the engagement of the fastening protrusions 50a of the console 30 with the fastening recesses 18 of the folding seat 10.

Next is a description of a behavior of the lid body 36 of the above-structured console 30 for vehicle of the invention.

Figure 13:
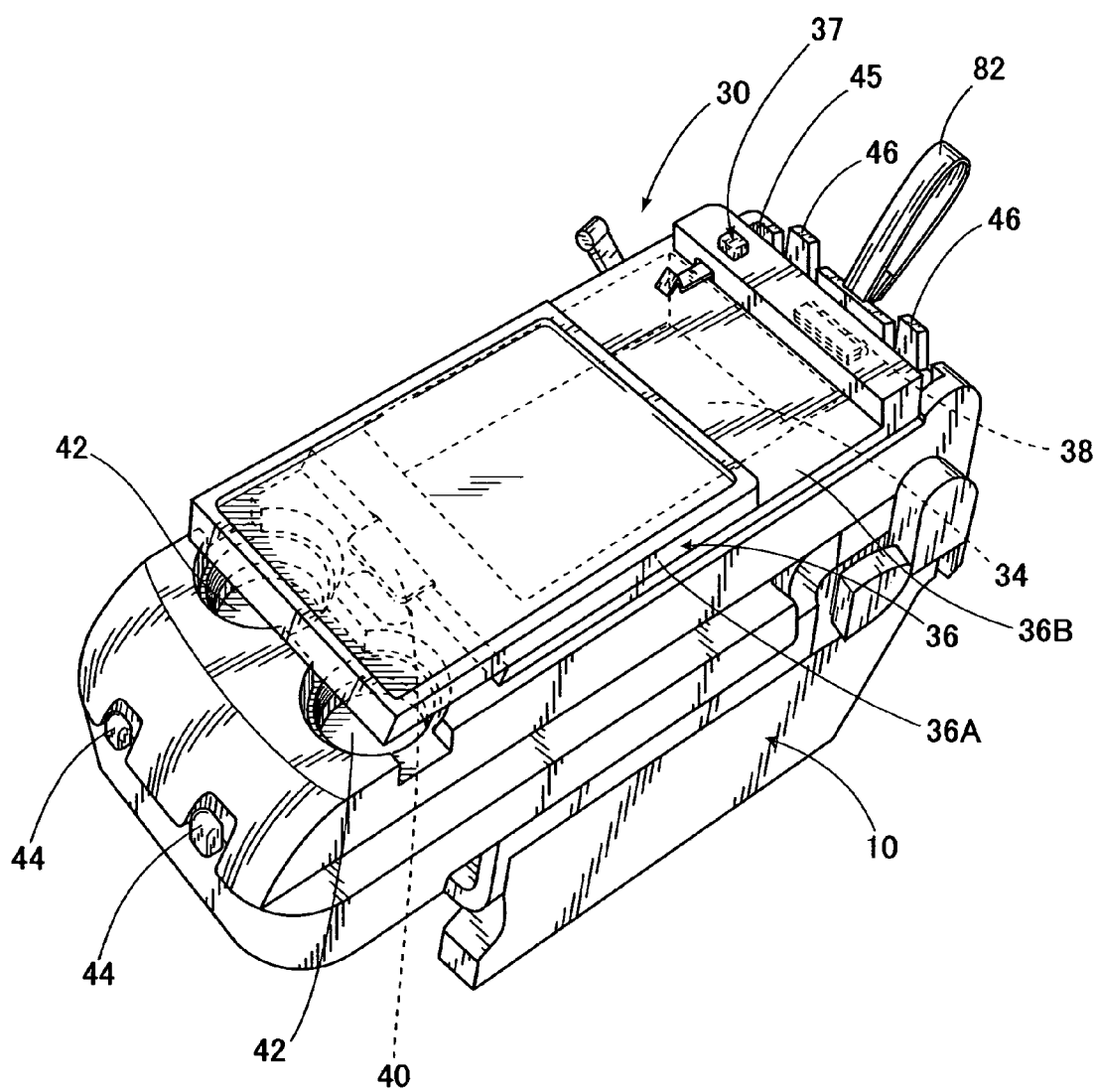
FIG. 13 is a perspective view showing the console for vehicle of the present invention attached to the folding seat, with the upper lid portion of the lid body being slid sideways.

As illustrated in FIG. 13, when manually exerting a forward force on the upper lid body 36A of the lid body 36 of the console 30, the upper lid body 36A is allowed to slide forward relative to the lower lid body 36B due to the side member 36b of the upper lid body 36A being slidable relative to the slide rail member 36e of the lower lid body 36B. At that moment, as the rib 36b1 of the slide member 36b is in contact with a distal end of the spring member 36e2 in a manner capable of sliding intermittently, the upper lid body 36A is held in a predetermined position relative to the lower lid body 36B. Further, the upper opening of the recess 34 is partly or entirely covered due to the upper lid body 36A sliding relative to the lower lid body 36B.

Figure 14A:
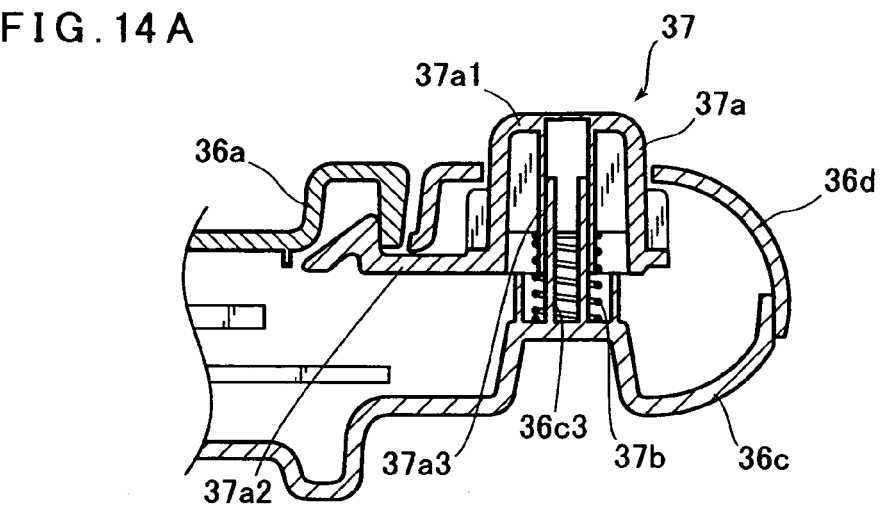
FIGS. 14A to 14C are schematic sections illustrating methods for releasing the engagement of the upper lid portion with the lower lid portion by the locker means of the lid body of the console for vehicle of the present invention, and then engaging the upper lid body therewith again.
Figure 14B:
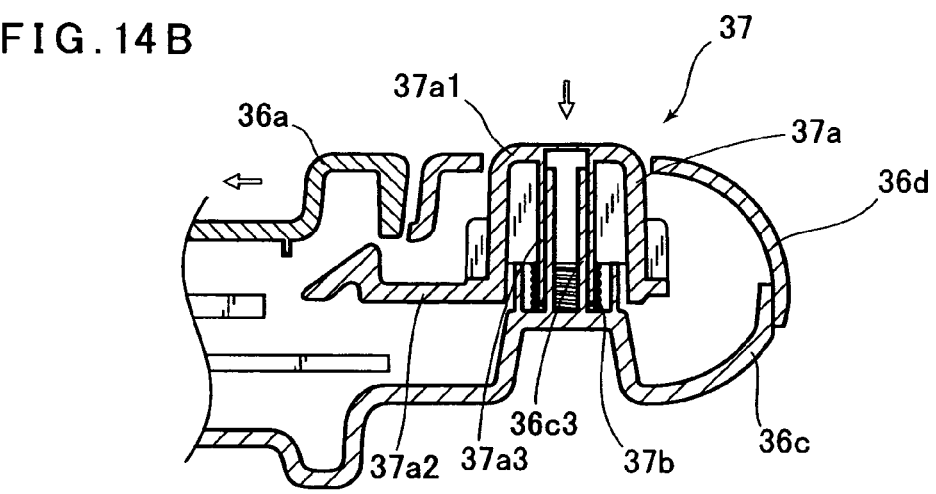
Figure 14C:
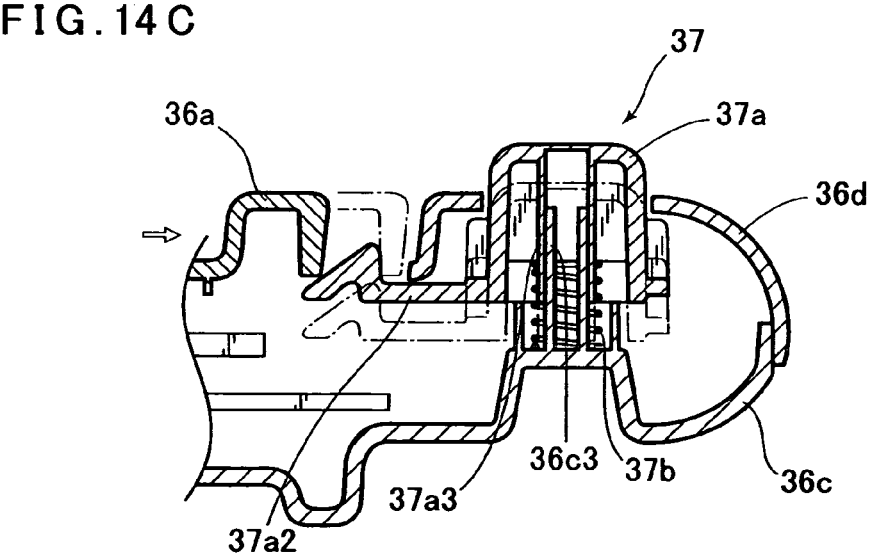

Next are descriptions of a method for releasing the engagement of the upper lid body 36A with the lower lid body 36B by the locking means 37 of the lid body 36 of the console 30 and a method for re-engagement of the upper lid body 36A with the lower lid body 36B. FIG. 14A illustrates the upper lid body 36A that is being locked in the lower lid body 36B by the locking means 37 of the lid body 36 of the console 30. FIG. 14B illustrates a method for releasing the upper lid body 36A from the engagement with the lower lid body 36B. FIG. 14C illustrates a method for engaging the upper lid body 36A that was disengaged from the lower lid body 36B with the same again. As shown in FIG. 14A, the upper lid body 36A is engaged with the lower lid body 36B, with the locking member 37a of the locker means 37 being biased upward by the coil spring 37b while the distal end of the engaging portion 37a2 of the locking member 37a engaging with the inner surface of the edge of the tray member 36a of the upper lid body 36A. In the case of releasing the engagement of the upper lid body with the lower lid body 36B, the button 37a1 of the locking member 37a is pressed downward by a finger or the like, while a forward force is manually exerted on the tray member 36a of the upper lid body 36A, as shown in FIG. 14B. If the button 37a1 is pressed thus way, the engagement of the distal end of the locking portion 37a2 of the locking member 37a with the inner surface of the edge of the tray member 36a is released, thus making it possible to disengage the upper lid body 36A from the lower lid body 36B.

Upon the disengagement of the upper lid body 36A from the lower lid body 36B, the locking member 37a is brought into contact with the inner surface of the second base member 36d due to being biased by the coil spring 37b. In the case of engaging the upper lid body 36A that was once disengaged from the lower lid body 36B with the lower lid body 36B again, a backward force is manually exerted on the tray member 36a of the upper lid body 36A, as shown in FIG. 14.C. Thus, the back end of the tray member 36a is pressed by the inclined surface at the distal end of the engaging portion 37a2, and thus the engaging portion 37a2 is in turn descended while withstanding the biasing force from the coil spring 37b, so that the back end of the tray member 36a goes beyond the upper end of the distal end of the engaging portion 37a2 so that the inside edge thereof engages with the distal end of the engaging portion 37a2, whereby the upper lid body 36A can be locked by the lower lid body 36B by the above-described operations.

The console 30 for vehicle according to the foregoing embodiment is the one that is detachably attached to the seat portion 12 in a manner covering the rear surface of the seat back 14 with the folding seat 10 being folded with the front surface of the seat back 14 facing the seat portion 12, said console for vehicle 30 comprising the lid body 36 provided for opening or closing the opening of the recess 34 in which goods can be placed, said lid body 36 including the upper lid body 36A and the lower lid portion 36B with the upper lid body 36A being slidable relative to the lower lid body 36B, whereby there can be provided a console for vehicle which enables the stable carrying of goods during the travel of the vehicle. Further since the area of the top surface of the lid body 36 for console is enlargeable, there can be provided a console 30 for vehicle with an improved convenience in placing goods on the top surface of the lid body 36.

Furthermore, according to this embodiment, since the recesses 42 and/or 45 for placing goods therein, as well as the projections 44 and/or 46 for hanging goods therefrom are provided, while a part or whole of the upper openings of the recesses 42 and 45 is/are covered with the upper lid body 36A, it is possible to place goods on the top surface of the lid body 36 without being hindered by the recess 42 or 45.

Moreover, according to this embodiment, since the upper lid body 36A of the lid body 36 of the console 30 is capable of sliding intermittently relative to the lower lid body 36B thereof, the upper lid body 36A of the lid body 36 can be held in a position that makes the area of a top surface of the upper lid body 36A most convenient to a user relative to the lower lid body 36B, in accordance with goods placed on the upper lid body 36A.

Still further, since the locking member 37 is provided in order to releasably lock the upper lid portion 36A relative to the lower lid portion 36B of the lid body 36 of the console 30, the possible slide of the upper lid body 36A relative to the lower lid body 36B due to acceleration/deceleration of vehicles or the like can be prevented.

The present invention should not be limited to the foregoing emboldens, but may be modified within the scope of the invention.

What is claimed is:

1. A console for a vehicle said console being detachably attached to a seat portion of a folding seat in a manner covering a rear surface of a seat back of the folding seat with a front surface of the seat back being folded to face the seat portion, comprising:
   a first recess for storage of goods with an opening on a top side; and
   a lid body for opening and closing the first recess, said lid body comprising an upper lid portion and a lower lid portion, said upper lid portion being slidable intermittently relative to the lower lid portion;
   wherein said upper lid portion includes a rib-shaped portion including recesses at predetermined intervals, while said lower lid portion includes a spring member resiliently abutting to said rib.

2. A console for a vehicle, said console being detachably attached to a seat portion of a folding seat in a manner covering a rear surface of a seat back of the folding seat with a front surface of the seat back being folded to face the seat portion, comprising:
   a first recess for storage of goods with an opening on a top side;
   a lid body for opening and closing the first recess, said lid body comprising an upper lid portion and a lower lid portion, said upper lid portion being slidable intermittently relative to the lower lid portion; and
   at lease one of second recess for placing goods thereon and a projection for hanging goods therefrom, said second recess having an opening partly or entirely covered with said upper lid portion:
   wherein said upper lid portion includes a rib-shaped portion including recesses at predetermined intervals, while said lower lid portion includes a spring member resiliently abutting to said rib.

3. The console for a vehicle according to claim 2, wherein said lower lid portion includes a locking member releasably locking said upper lid portion to said lower lid portion.

4. A console for a vehicle, said console being detachably attached to a seat portion of a folding seat in a manner covering a rear surface of a seat back of the folding seat with a front surface of the seat back being folded to face the seat portion, comprising:
   a first recess for storage of goods with an opening on a top side;

a lid body for opening and closing the first recess, said lid body comprising an upper lid portion and a lower lid portion, said upper lid portion being slidable relative to the lower lid portion; and at least one of a second recess for placing goods thereon and a projection for hanging goods therefrom, aid second recess having an opening partly or entirely covered with said upper lid portion;

wherein said lower lid portion includes a locking member releasably locking said upper lid portion to said lower lid portion.

5. A console for a vehicle, said console being detachable attached to a seat portion of a folding seat in a manner covering a rear surface of a seat back of the folding seat with a front surface of the seat back being folded to face the seat portion, comprising:

a first recess for storage of goods with an opening on a top side;

a lid body for opening and closing the first recess, said lid body comprising an upper lid portion and a lower lid portion, said upper lid portion being slidable relative to the lower lid portion; and at least one of a second recess for placing goods thereon and a projection for hanging goods therefrom, said second recess having an opening partly or entirely covered with said upper lid portion;

wherein said lower lid portion includes a locking member releasably locking said upper lid portion to said lower lid portion.

6. The console for a vehicle according to claim 1, wherein said lower lid portion includes a locking member releasably locking said upper lid portion to said lower lid portion.

* * * * *